United States Patent [19]

Schell et al.

[11] 4,398,097

[45] Aug. 9, 1983

[54] AUTOMATIC TRANSFER SWITCH

[75] Inventors: Frank M. Schell, Towaco; George S. DiMonico, Waldwick; Joseph Bania, Chatham, all of N.J.

[73] Assignee: Indian Head, Inc., New York, N.Y.

[21] Appl. No.: 343,048

[22] Filed: Jan. 27, 1982

Related U.S. Application Data

[63] Continuation of Ser. No. 101,741, Dec. 10, 1979, abandoned.

[51] Int. Cl.³ ............................................... H02J 7/00
[52] U.S. Cl. .................................................... 307/64
[58] Field of Search .................................... 307/64–68, 307/85–87; 200/144; 361/2, 3; 335/161

[56] References Cited

U.S. PATENT DOCUMENTS

| 2,745,971 | 5/1956 | Robertson | 307/64 |
| 2,861,198 | 11/1958 | Soos | 307/64 |
| 3,246,100 | 4/1966 | Russell | 335/161 X |
| 4,157,461 | 6/1979 | Wiktor | 307/64 X |

OTHER PUBLICATIONS

Diesel & Gas Turbine Progress, Apr. 1979, Lexco 250 Automatic Transfer Switch.

*Primary Examiner*—Donald A. Griffin
*Attorney, Agent, or Firm*—A. A. Saffitz

[57] ABSTRACT

An automatic transfer switch comprising a pair of molded case switches, a novel cam drive mechanism and a lever linkage is provided to assure a programmed timed sequence of contact transfer so that arc extinction is achieved in load transfer and re-transfer between normal and emergency power sources, thereby preventing source to source short circuits. To prevent motor override from disturbing the cam during stopping, declutching or escapement means is provided to separate the drive pin in the cam plate from the motor drive. Improved transfer for motor loads may be achieved by additional escapement and time delay intervals in the transfer between normal and emergency sources. To facilitate the starting and stopping of the motor drive, auxiliary contact means are provided which coact with the outside periphery of the cam plate to open and to close the incoming power for the electric motor drive. The toggle of each molded case switch is positioned in precise relationship by the cam mechanism to insure that only one toggle is in the on position at any one time. An auxiliary mechanical interlock which is operated by the molded case switch contacts is provided to assure that contacts of the two molded case switches cannot be closed simultaneously. Load connectors can be mounted to either the top or bottom of a novel bus bar arrangement which allows easy attachment of incoming load cables. An easily detachable mounting for the two molded case switches on the vertically extending bus bars is provided whereby both molded case switches can be replaced without the disconnection of external power conductors.

7 Claims, 11 Drawing Figures

Fig. III

Fig. 11.

AUTOMATIC TRANSFER SWITCH

This is a continuation of application Ser. No. 101,741, filed Dec. 10, 1979 and now abandoned.

BACKGROUND OF THE INVENTION

1. Field of the Invention

This invention is in the field of automatic transfer switches utilizing a cam mechanism for driving the power switching device for transferring load circuits from normal source to emergency source and vice versa.

2. Description of the Prior Art

Russell, U.S. Pat. No. 3,246,100, shows an automatic transfer switch comprising first and second switch mechanisms, each of said mechanisms having a toggle connected to a contact arm for moving the arm between an open position and a closed position and means rigidly interlocking the arms for simultaneous movement of said arms whereby only one of said arms can be closed at one time. Russell teaches a specific drive system.

Soos, Jr., U.S. Pat. No. 2,861,198, shows an automatic transfer switch using a part of side-by-side circuit breakers. Soos, Jr. teaches a special drive system.

DISTINCTIONS OVER THE PRIOR ART

With both the Russell and Soos, Jr. patents, the arc extinguishing problem exists to a troublesome degree and without regard to the magnitude of the current. There is a real need in the art to assure that the arc is completely extinguished before connecting a second or alternate source to the load circuits. The present invention provides a timing sequence means which is entirely different from the driving systems in either Soos, Jr. or in Russel.

In Soos, Jr. and in Russell there is no reliance on programmed timed sequence to permit arc extinction. Indeed, the opposite objective of simultaneous operation is emphasized by Soos, Jr. and Russell. The present invention is based upon the novel concept that a programmed timed sequence during transfer and retransfer is essential to prevent a short circuit between sources via the arc formed on opening one contact and closing of the other contact. It is essential in accordance with the invention that these two sources not be connected via the arc. Otherwise, the electrical equipment may be destroyed.

OBJECTS OF THE INVENTION

An object of the invention is to provide a new automatic transfer switch comprising a cam drive mechanism and lever linkage to achieve load transfer between normal and emergency power sources in a programmed timed sequence which prevents short circuits via arc formation at the contacts.

Another object of the invention is to provide a pair of commercially available molded case switches in a new bolted mounting over vertically extending bus bars whereby the switches are bus mounted directly to the line and to the load copper bus bars, each of the molded switch cases having a spring loaded over-the-center toggle mechanism for quick make and for quick break of the power contacts.

A still further object is to provide a mounted assembly of molded case switches wherein the switches are further provided with steel vanes which encompass the switch contacts and become magnetized by the magnetic field which surrounds the current conductors, the switch in effect of these magnetized vanes being to move the arc into the arc chambers of the molded case switches to effectively stretch and cool the arc to disruption.

A still further object is to add to the arc extinguishing function of the magnetized steel vanes in the pair of molded case switches, a programmed dwell sequence from a gear motor driven cam mechanism which allows adequate time to assure arc-extinction driving transfer and retransfer objectives.

A further object of the invention is to provide novel declutching or escapement means to separate the drive pin in the cam plate of the cam drive mechanism from the motor drive whereby motor overrun does not create unwanted cam movement and permitting the motor to coast to a halt.

A further object of the invention is to provide additional pins and an additional escapement for these pins whereby declutching of the drive from the cam may occur at preselected intervals about the cam for motor load transfer.

A still further object of the invention is to provide a more efficient arrangement of detachable bus bar connectors for vertically stacked bus bars to permit more compact construction, easier installation and easier maintenance, the connectors being movable from the top to the bottom of the vertically stacked bus bars.

Another object of the invention is to provide an auxiliary mechanical interlock means for the switch contacts embodying a pair of plungers mounted on a fulcrummed elongated member, each plunger being insertable into a molded case switch whereby when one plunger is up, the other is down, assuring that the auxiliary interlock prevents a short circuit between switch contacts and to thereby assure safety.

Other objects of the invention include the provision of time delay means for motor load transfer and manual operating means for manual load transfer.

Still other objects will be seen from the detailed description which follows and the drawings herein.

SUMMARY OF THE INVENTION

A compact automatic transfer switch comprising a pair of molded case switches of the type which are commercially available and are electrically associated with vertically stacked bus bars for normal and emergency load connections wherein detachable connectors are provided for top or bottom connection of load cables for load circuits together with a cam mechanism and lever interconnections driven by a motor to precisely position the power switch contacts in the molded case, the cam operation assuring a programmed time sequence for arc extinction at the switch contacts before the switch contact of the second switch is closed to the emergency source or vice versa from the emergency source to the normal source. The motor for driving the cam mechanism is preferably a gear motor which is high torque and unidirectional. Two roller followers in the cam track of the cam plate each position one of the two rocker arms of the cam drive mechanism thereby providing a novel programmed sequencing of the two molded case switches, one for the normal power source and the other for the emergency source with one of the molded case switches being open or off while the other of the molded case switches is closed or on.

Visualization of these on and off conditions is provided by a toggle, one for each molded case switch.

The duration of the novel programmed sequencing between the two molded case switches is controlled by the cam dwell, and the gear motor speed of operation. Thus, the most important factors leading to arc formation and short circuits between power contacts are eliminated by non-simultaneous operation of the switching elements. Also positive interlocking is assured by the cam mechanism and only one toggle contact can be in the on position.

The rise or outer periphery of the cam actuates two auxiliary switch mechanisms, one on each side of the cam. These two mechanisms are used in conjunction with the electrical control means for stopping the drive system at the end of each transfer operation.

The stopping of the drive system after each transfer operation creates the problem of motor override with its consequent movement of the cam which is driven by the motor. To solve this problem, a declutching or escapement mechanism is provided which allows the drive system to be disconnected after each transfer operation and at the same time allows the motor to come to rest without disturbing the cam mechanism. Since all other parts of the cam mechanism are still connected after the escapement mechanism has effected the above disconnection to the motor, the result is that a precise positioning of the molded case switches is maintained and the automatic transfer switch is locked in its proper position. In short, disconnecting the motor from the cam does not affect the relationship between the two molded case switches, so that one case switch cannot be turned on while the other is on. Various commercial sources for molded case switches fitted with arc extinguishing means are known, for example General Electric Company, Westinghouse, ITE Circuit Breaker Company, GTE (Sylvania Division) and others.

An alternate embodiment, time delay for motor load transfer is provided to remove the system voltage from load circuits during each transfer operation to allow motor loads to decay to substantially zero before connection to the second source is made. For this alternate embodiment, additional drives pins are added to the cam. An additional wear shoe and a friction means are also added to the drive system.

The transfer and retransfer operations are controlled by an electronic solid-state control module in conjunction with an electrical control scheme comprising electromagnetic components. The module includes voltage and frequency monitoring devices which are used in conjunction with time delay means in order to monitor the normal and emergency power sources.

The electrical control encompasses power components to control gear motor operation while maintaining source-to-source isolation. These control power components include a power relay, a control transformer and auxiliary switches. A motor protector relay circuit is also provided to insure that the gear motor is protected against low voltage which is below the minimum operating voltage of the motor.

DESCRIPTION OF THE PREFERRED AND ALTERNATE EMBODIMENTS

Figure 1:
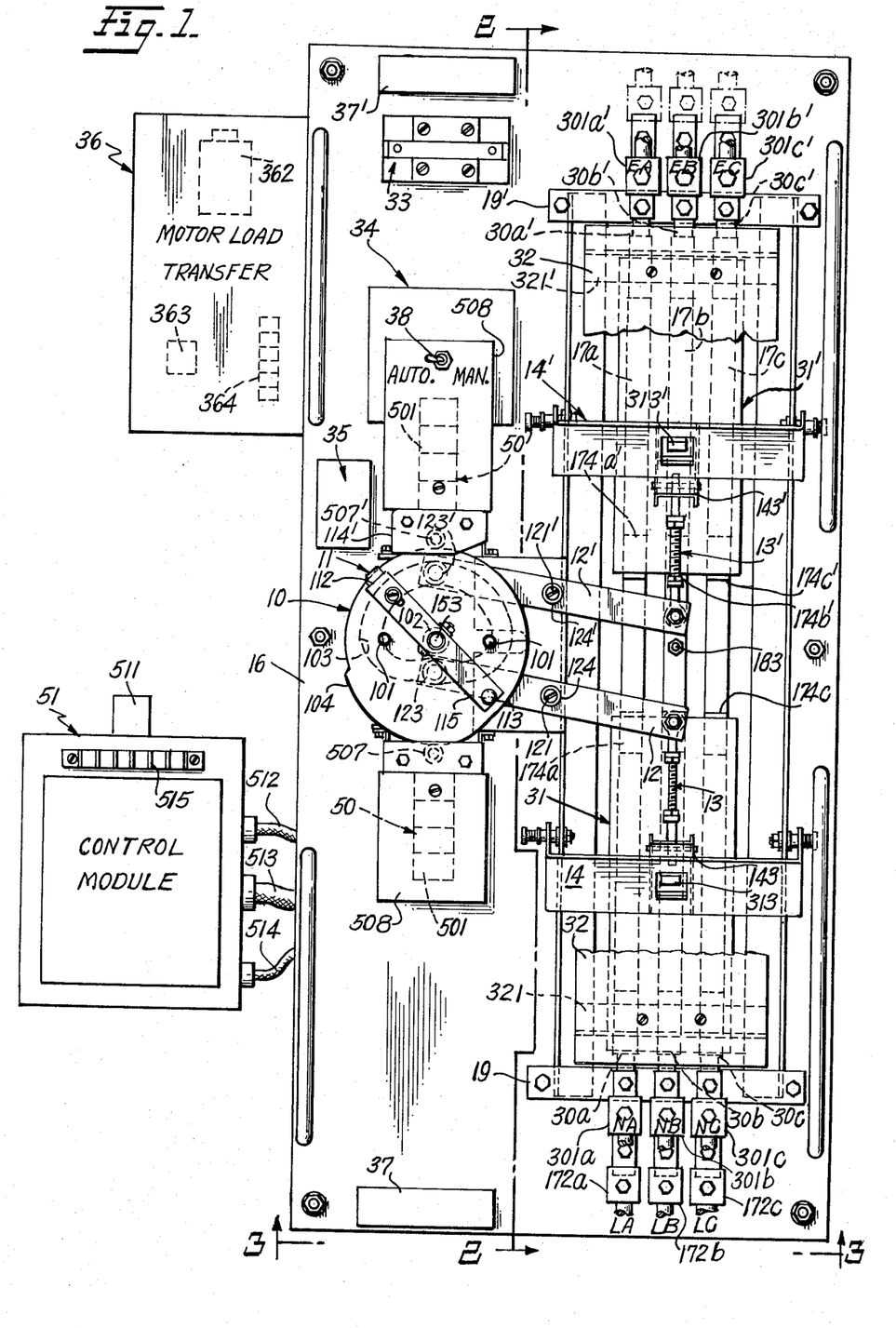
FIG. 1 is a plan view of a preferred embodiment of the automatic transfer switch of the present invention together with its associated control module.
Figure 2:
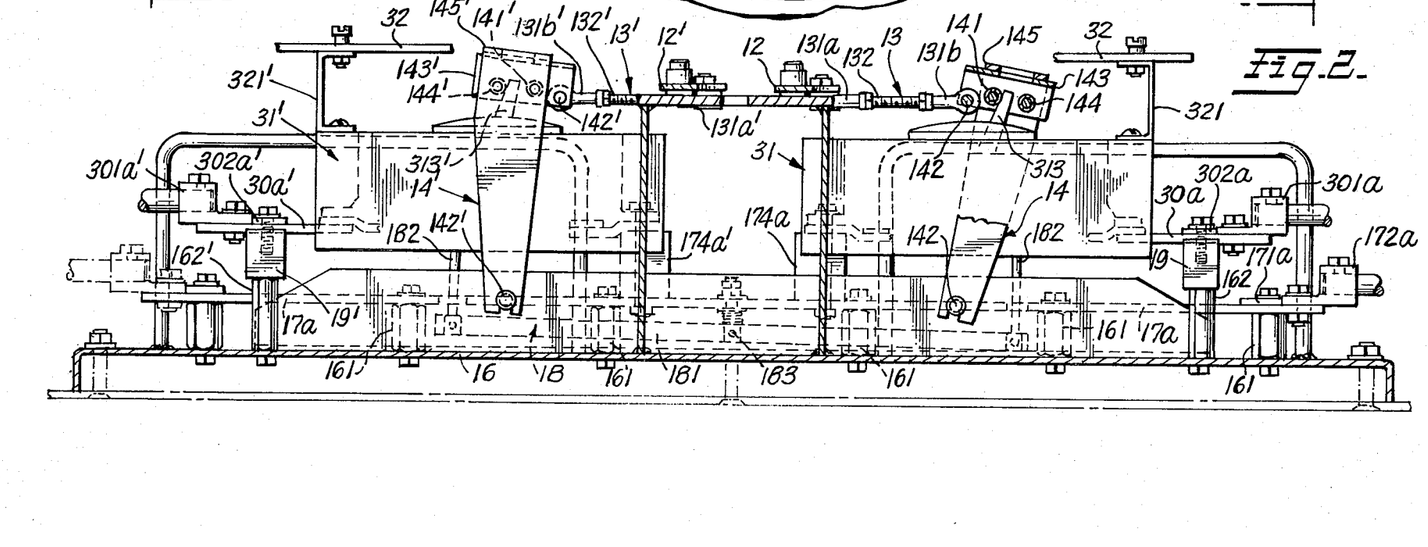
FIG. 2 is a longitudinal vertical sectional view on a slightly larger scale taken on the line 2—2 of FIG. 1.
Figure 3:
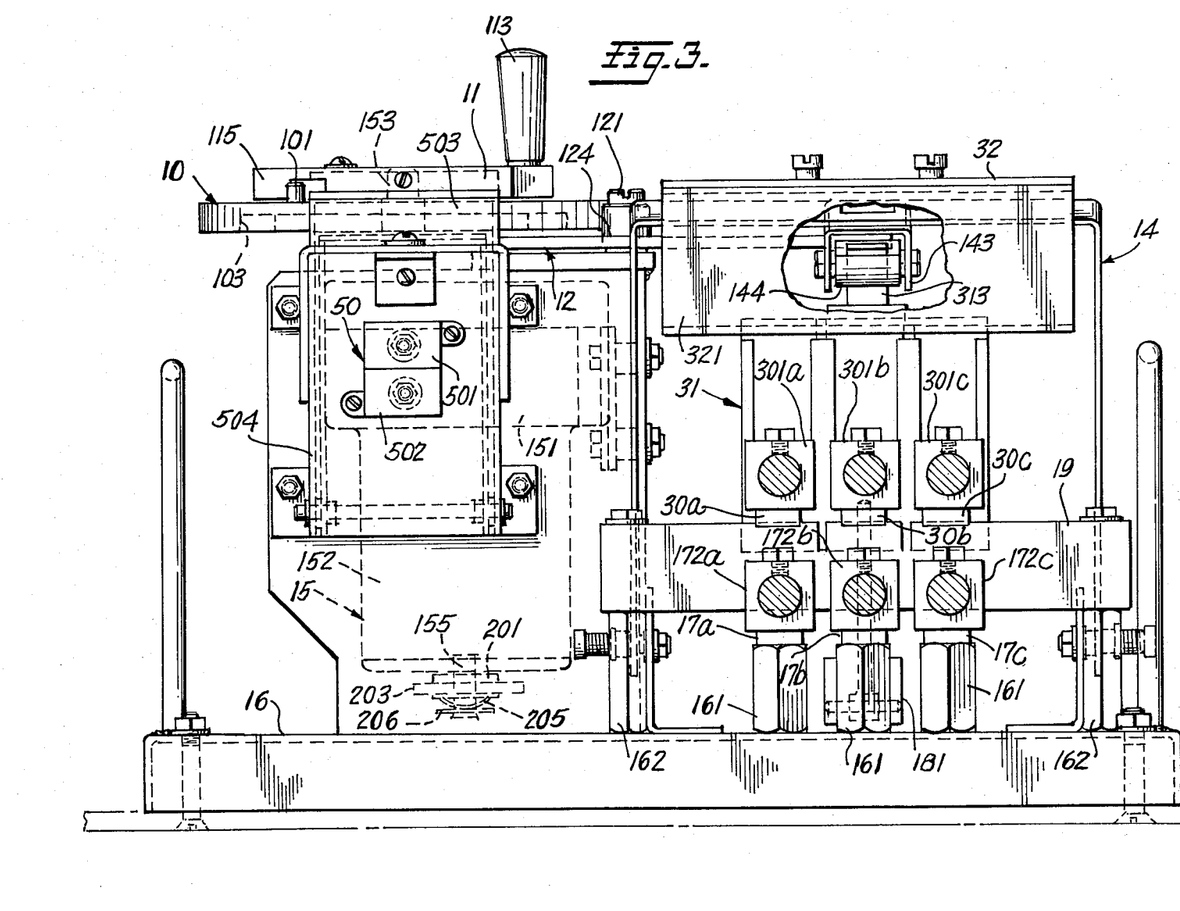
FIG. 3 is an enlarged end elevational view taken on the line 3—3 of FIG. 1.
Figure 4:
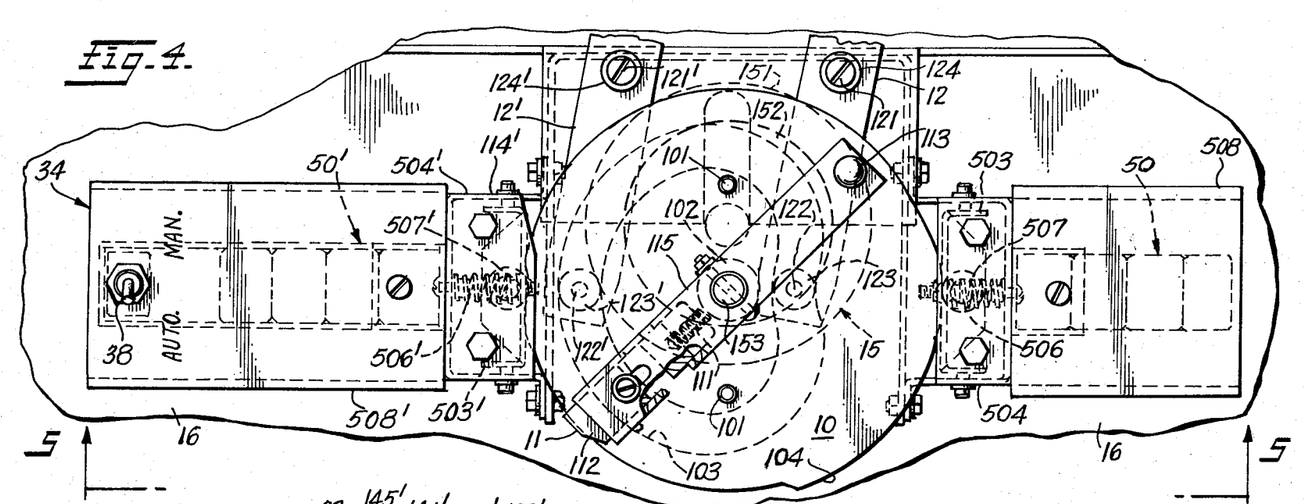
FIG. 4 is an enlarged fragmentary plan view of the drive arm and of the plate groove cam of the preferred embodiment of the automatic transfer switch of the invention.
Figures 5, 6, 7:
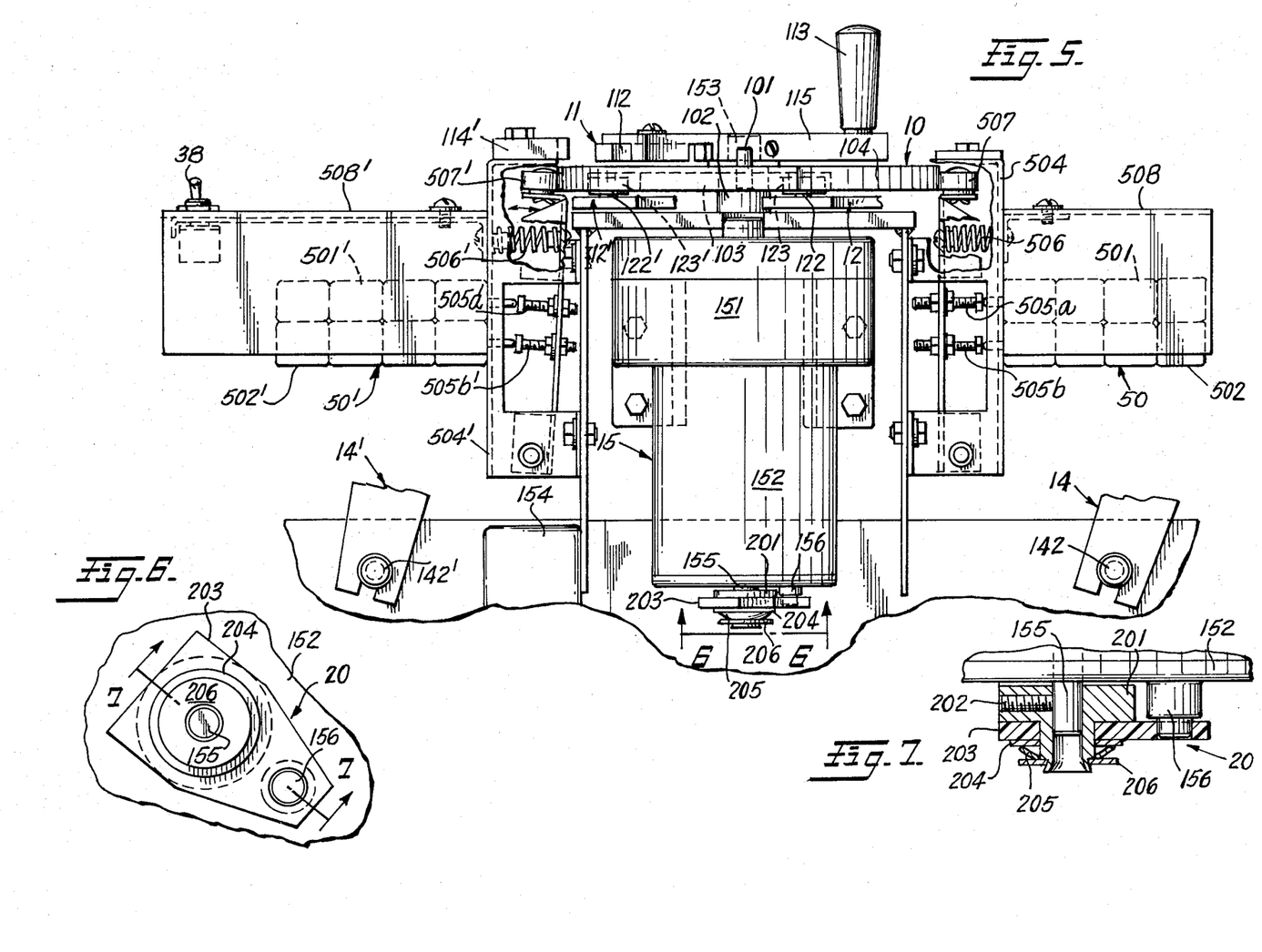
FIG. 5 is an enlarged fragmentary side elevational view of the drive arm and the plate groove cam taken along the line 5—5 of FIG. 4.
FIG. 6 is an enlarged fragmentary bottom plan view of the friction mechanism for the motor shaft taken along the line 6—6 of FIG. 5.
FIG. 7 is a fragmentary vertical sectional view taken on the line 7—7 of FIG. 6.

The elements of the preferred automatic transfer switch shown in FIGS. 1-8 and 10 are as follows:

(1) the cam mechanism of FIGS. 1, 4 and 5;
(2) the declutching or escapement means 11 with associated wear shoe in FIGS. 1, 4 and 5;
(3) the rocker arms 12 and 12' in FIGS. 1 and 4;
(4) the connecting linkages 13 and 13' in FIGS. 1, 2 and 8;
(5) the operating brackets 14 and 14' in FIGS. 1, 2 and 3;
(6) the unidirectional gear motor 15 which is shown in FIGS. 3 and 5;
(7) the mounting panel 16 shown in both FIGS. 1 and 2;
(8) the vertically extending load bus bars 17a, 17b, 17c in FIGS. 1, 2 and 3;
(9) the mechanical interlock 18 in FIGS. 2 and 8;
(10) the bridge blocks insulating supports 19 and 19' for the line connections which connect each switch (31,31') to the incoming cables of normal and emergency sources in FIGS. 1,2 and 3;
(11) the line bus bars 30a, 30b, 30c, 30a', 30b', and 30c' in FIGS. 1 and 3;
(12) the molded case switches 31 and 31' in FIGS. 1, 2, 3, 8, 10 and 11;
(13) the top cover 32 shown in FIGS. 2 and 3;
(14) the transfer control relay 33 shown in FIGS. 1,10 and 11;
(15) the control transformer 34 shown in FIGS. 1, 10 and 11;
(16) the motor protector relay 35 shown in FIGS. 1, 10 and 11;
(17) the motor load transfer assembly 36 shown in FIGS. 1 and 7;
(18) the terminal blocks 37, 37' shown in FIGS. 1, 10 and 11;
(19) the motor disconnect switch 38 shown in FIGS. 1, 4 and 10;
(20) the auxiliary contact assembly 50 shown in FIGS. 1,5,10 and 11;
(21) the test switch 39 shown in FIG. 10; and
(22) the electronic control module 51 shown in FIGS. 1 and 10.

Referring to FIGS. 1, 2, 3, 4, and 5 herein, the detailed description of items (1) to (6) is as follows:

The cam 10 is a plate-groove type, circular in shape with an inner (bottom) track 103 and a rise 104 along its outer periphery. Into the center of the cam is pressed a hub 102 which pivots about the unidirectional gear motor shaft 153. Into the top of the cam 10 is pressed two drive pins 101 which drive the cam 10. The drive pin 101 is driven by the declutch assembly 11, which is rigidly fixed to the motor shaft 153.

The unidirectional gear motor 15 in FIG. 3 consists of a permanent split capacitor motor 152 coupled to a gearhead 151. Gearhead 151 and motor 152 make gear motor 15. The motor shaft 153 extends from the gearhead 151. The motor shaft passes through the cam assembly 10 and declutch assembly 11. The motor capacitor 154 is connected to the windings of the motor 152, the windings being convention 1 and not shown.

The declutch assembly 11 consists of a drive arm 115, slide 112, spring 111, one wear shoe 114' and a manual operating handle 113. One wear shoe 114' is essential, the second optional. The slide 112 which is spring-loaded by spring 111 within the drive arm 115 drives the drive pin 101 in the cam assembly 10.

When the slide 112 and drive arm 115 strike the wear shoe 114', the slide 112 is pushed deeper into the drive arm 115. The drive pin 101 escapes the declutch mechanism 11 through a slots formed by an opening in both slide 112 and in drive arm 115.

The rocker arms 12 and 12' include pivot points 121 and 121'. At one end of a dowel pin 122, 122' is pressed a bar 124, 124' about which a roller 123, 123' pivots. The rollers 123, 123' are within and follow the cam track 103. On the opposite end of the rocker arm assembly 12, 12', provision is made for a connection of the connecting linkage assembly 13, 13'.

Figure 8:
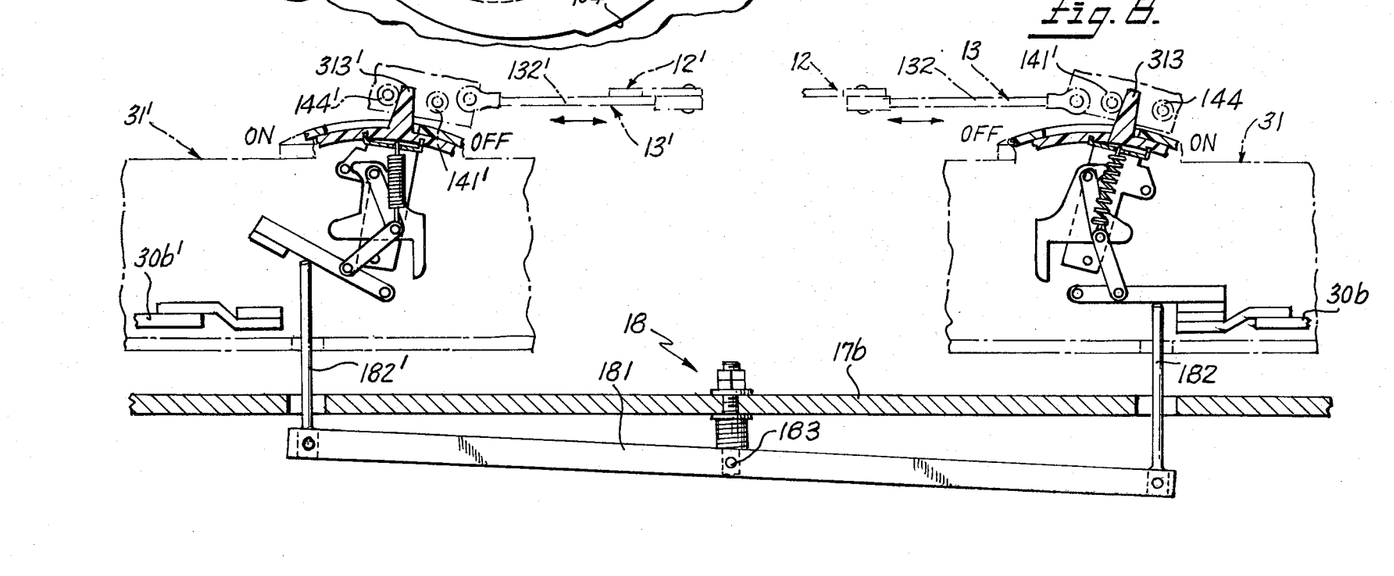
FIG. 8 is a diagrammatic view showing the interlocking mechanism of the two transfer switches of FIG. 2.

The connecting linkage 13, 13' consists of a threaded rod 132, 132' with rod ends 131a, 131b, 131a', 131b' fixed to both sides for connection to rocker arm assembly 12, 12' and to operate bracket assembly 14, 14'.

The operating bracket assembly 14, 14' consists of a bracket 145, 145' with a pivot 142, 142'. To the top of the bracket 145, 145' is connected a carriage 143, 143' which consists of a mounting means for connection to the connecting linkage rod ends 131b, 131b'. Also, two rollers 141, 141', 144, 144' are attached to the carriage 143, 143'. The toggle 313, 313' of each molded case switch 31, 31' is positioned between each pair of rollers 141, 144 and 141', 144'. Roller 144 drives the normal molded case switch 31 to the off position and roller 141 drives it to the on position. Roller 144' drives the emergency switch 31' to the open position and roller 141' drives it to the closed position.

For convenience, the mechanical sequence of operation will be described first, mechanical mounting second and the electrical sequence last.

A detailed mechanical sequence of operation of items 1 to 6 is as follows:

The initial conditions are as follows:

Normal source molded case switch 31 is in the closed position; the emergency source molded case switch 31' is in the open position. The cam 10 and declutch assembly 11 are in the position shown in FIG. 1. Rocker arms 12, 12', connecting linkage 13, 13' and operating brackets 14, 14'. Only one wear shoe 114' is present and two drive pins 101 are present at 0° and 180°.

Transfer to the emergency source is initiated by applied power to the gearmotor 15 through auxiliary contact assembly 50. The gearmotor shaft 153 and declutch 11 assembly rotates counterclockwise and engages the drive pin 101 at approximately 180 degrees. During this initial movement, the cam assembly 10 is stationary. When the cam drive pin 101 engages the declutch assembly 11, the cam 10 begins to rotate. The roller 123 which rotates in cam track 103 is pushed outward towards the cam track 103 dwell. The rocker arm 12 pivots and pulls the connecting linkage 13 and the operating bracket 14. The roller 144 engages the toggle 313 of the normal molded case switch 31 and moves the toggle 313 toward the open position. As the cam 10 approaches the dwell position, the normal molded case switch 31 is tripped to the open position. During the above period, roller 123', part of rocker arm 12', has rotated within the dwell period of cam track 103. There was no movement of rocker arm 12'. After the normal molded case switch 31 trips to the open position, roller 123' which rotates in the cam track 103 is pulled inward. Rocker arm 12' pushes the connecting linkage 13' and the operating bracket 14'. The roller 141' engages the toggle 313' of the emergency molded case switch 31' and moves the toggle 313' toward the closed position. As the roller 123' approaches the most inward cam position, the emergency molded case switch is tripped to the closed position. During the above period, roller 123, part of rocker arm 12, has rotated within the dwell period of the cam track 103. There was no movement of the rocker arm 12. As the emergency source molded case switch 31' trips to the closed position, the declutch assembly 11, in particular the slide 112 strikes the wear shoe 114'. The slide 112 is pushed inward into the drive arm 115 and the drive pin 101 escapes. Also, the cam rise 104 comes into contact with roller 507 which actuates the auxiliary switch assembly 50' to de-energize the gear motor 15. The cam 10 remains stationary and the gearmotor 15 coasts to a halt. Transfer to the emergency source is complete.

When roller 507' begins to climb the cam rise 104, bracket 503' moves toward the normally closed auxiliary contacts 501' and the normally open auxiliary contacts 502'. When the actuating/adjusting screws 505' trip the auxiliary contacts 501',502', the contacts reverse position. Bracket 504' is the mounting surface for the auxiliary contacts 501',502'. Spring 506' is a return spring to bring the actuating bracket 503' to its initial position after the roller 507' rolls off the cam rise 104. Auxiliary contacts 501, 502 which are operated by roller 507 operate in the same manner covers 508, 508' protect the assembly. Retransfer to the normal source follows in the same manner; the emergency molded case switch 31' is opened and the normal molded case switch is closed. The second drive pin 101 is used for the movement.

ALTERNATE EXTENDED DWELL EMBODIMENT FOR MOTOR LOAD TRANSFER

Referring to FIGS. 5, 6, 7 and 9, a time delay for motor load transfer is provided to hold both molded case switches in the both off position to allow motor loads to decay.

For the motor load transfer operation, two more drive pins 101, a wear shoe 114 and a retarding friction means 20 are added to the mechanism. For each transfer to the Emergency source there are two declutches at 180 and 0 degrees. After the declutch at 180° and when both molded case switches 31, 31' are open, motion is stopped for a preselected time interval. To guarantee that the override of the unidirectional motor is held to a minimum after the first pin escapement, a retarding friction disc assembly 20 is provided. The friction disc assembly 20 comprises a flanged hub 201 having a flared top with a central bore to fit about the motor shaft 155 and secured by set screw 202 and a wear member 203 which is positioned against the flange of the hub 201 and a flat washer 204 which is spring loaded by a spring washer 205 secured by another flat washer 206. The assembly is held together by flaring the top of the hub 201.

During rotation of the motor shaft 155, wear member 203 exerts a constant pressure due to the spring washer 205. One end of the wear member 205 is fixed to a boss 156 on the motor 152.

Figure 9:
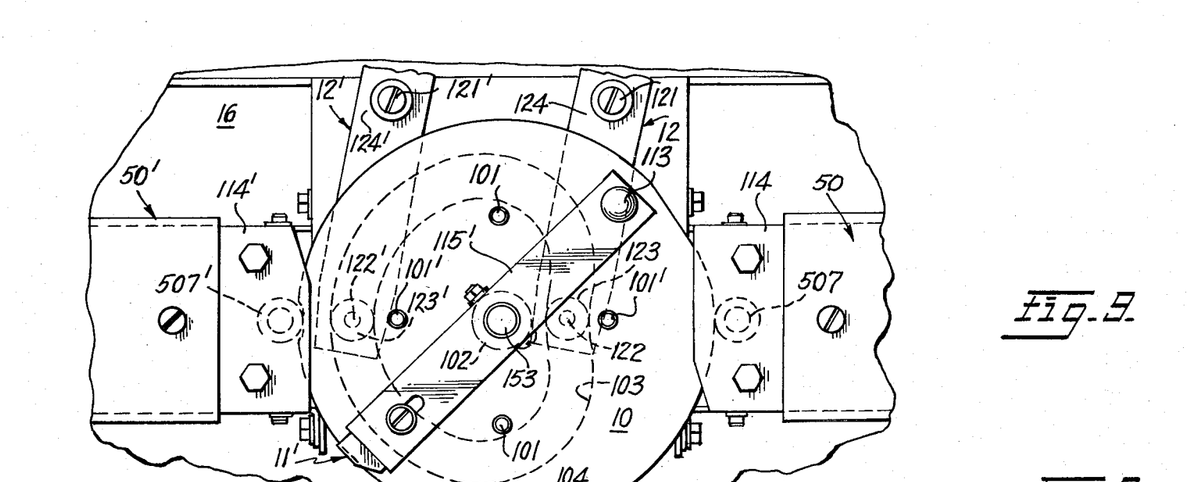
FIG. 9 is a fragmentary plan view similar to FIG. 4 but showing an alternate embodiment of the plate groove cam.

At the end of this interval, the drive system is re-energized to complete the transfer cycle. This movement is the same for retransfer to the normal source.

Referring now to FIG. 8, the description of time (9) is as follows:

A mechanical interlock assembly 18 is provided to prevent both the normal and emergency molded case switches 31, 31' from being closed simultaneously. It consists of an elongated pivoting member 181 to which is attached two insulated plungers 182, 182', one at each end. These plungers 182, 182' extend into the molded case switches 31, 31' through a clearance hole. Pivoting of the elongated member 181 occurs at the center pivot 183 and is supported at the center load bus bar 176. When the normal molded case switch 31 contacts are closed, the plunger 182 in the switch is driven outward. This motion drives the plunger 182' at the other end of the pivot inward against the contacts of the emergency molded case switch 31',thus preventing closure. The movement is reversed for closure of the emergency molded case switch 31' and the opening of the normal molded case switch 31.

Referring to FIGS. 1,2 and 3, the description of items (7), (8), (10), (11), (12) and (13) are as follows:

A mounting panel 16 is the supporting base on which all components are mounted. Multiple insulating supports 161 and hex standoffs 162, 162' are fastened to the panel 16. Insulating bridge blocks 19, 19' are mounted to the hex standoffs 162, 162' at each end of the panel 16. The bridge block 19 supports the normal source line copper 30a, b, c. Each line copper connects to a pole of the normal molded case switch 31 at its line side and to a respective normal source power conductor connector 301a, b, c. An anti-rotation stop 302a, b, c is attached to each line copper 30a, b, c to restrain connectors 301a, b, c from turning. Similarly stops 302a', b', c', are attached to each line copper 30a', b', c'.

The vertically stacked load coppers 17a, b, c mount to groups of insulating supports 161. Power load conductor connectors 172a, b, c and anti-rotation stops 171a, b, c are mounted at either end of load coppers 17a, b, c. Copper posts 174a, b, c are located offset of the center of load coppers 17a, b, c and connect the load coppers 17a, b, c to the normal molded case switch 31 at its load terminals. Copper posts 174a', b', c' are also located offset of the center of load coppers 17a, b, c and connect the load coppers 17a, b, c to the emergency molded case switch 31' at its load terminals.

A cover plate 32 which is used for instructional information is mounted to the molded case switches 31, 31' via channel brackets 321, 321'.

Figure 10:
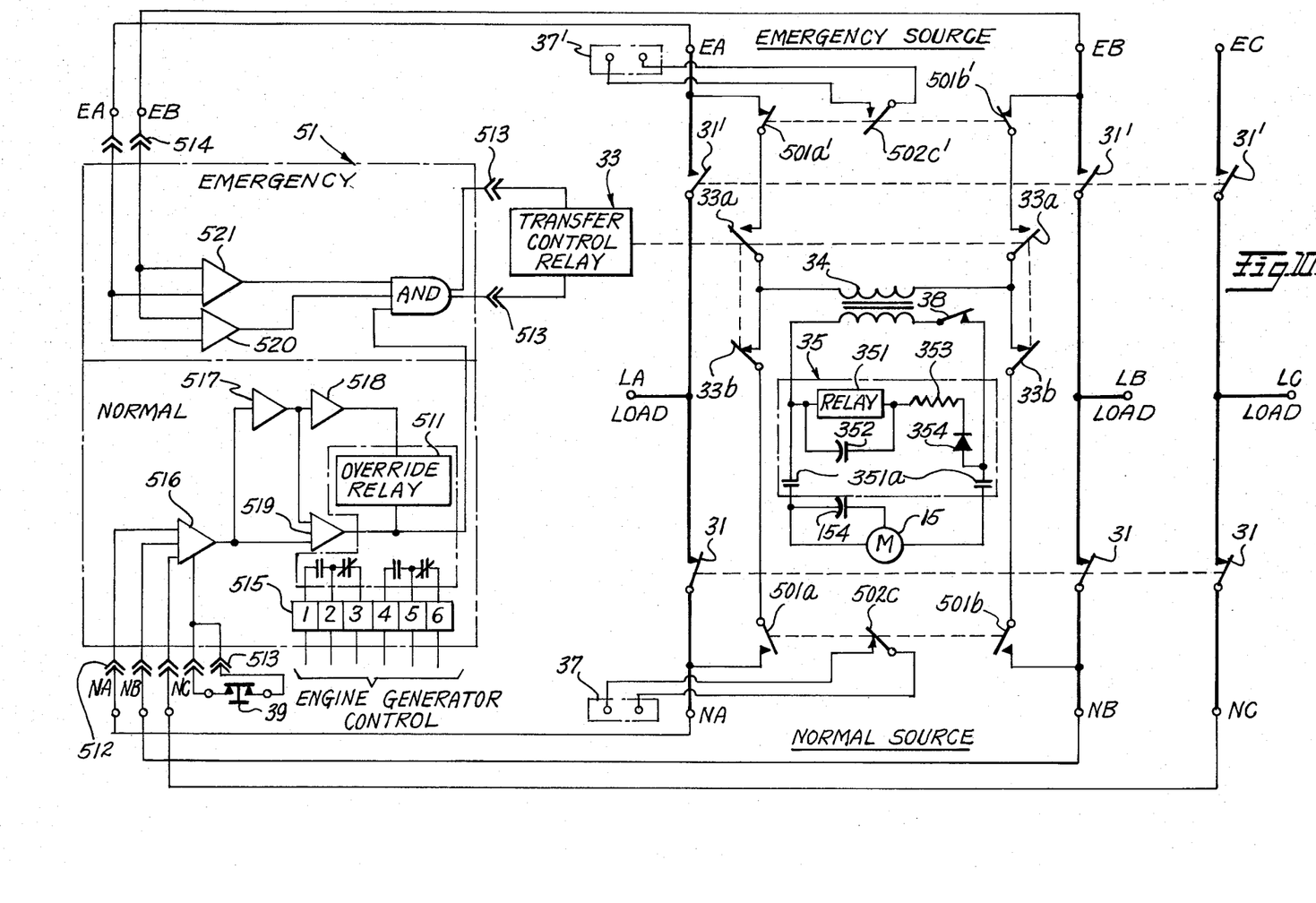
FIG. 10 is a schematic wiring diagram for the automatic transfer switches and control modules of FIGS. 1 and 2.
Figure 11:
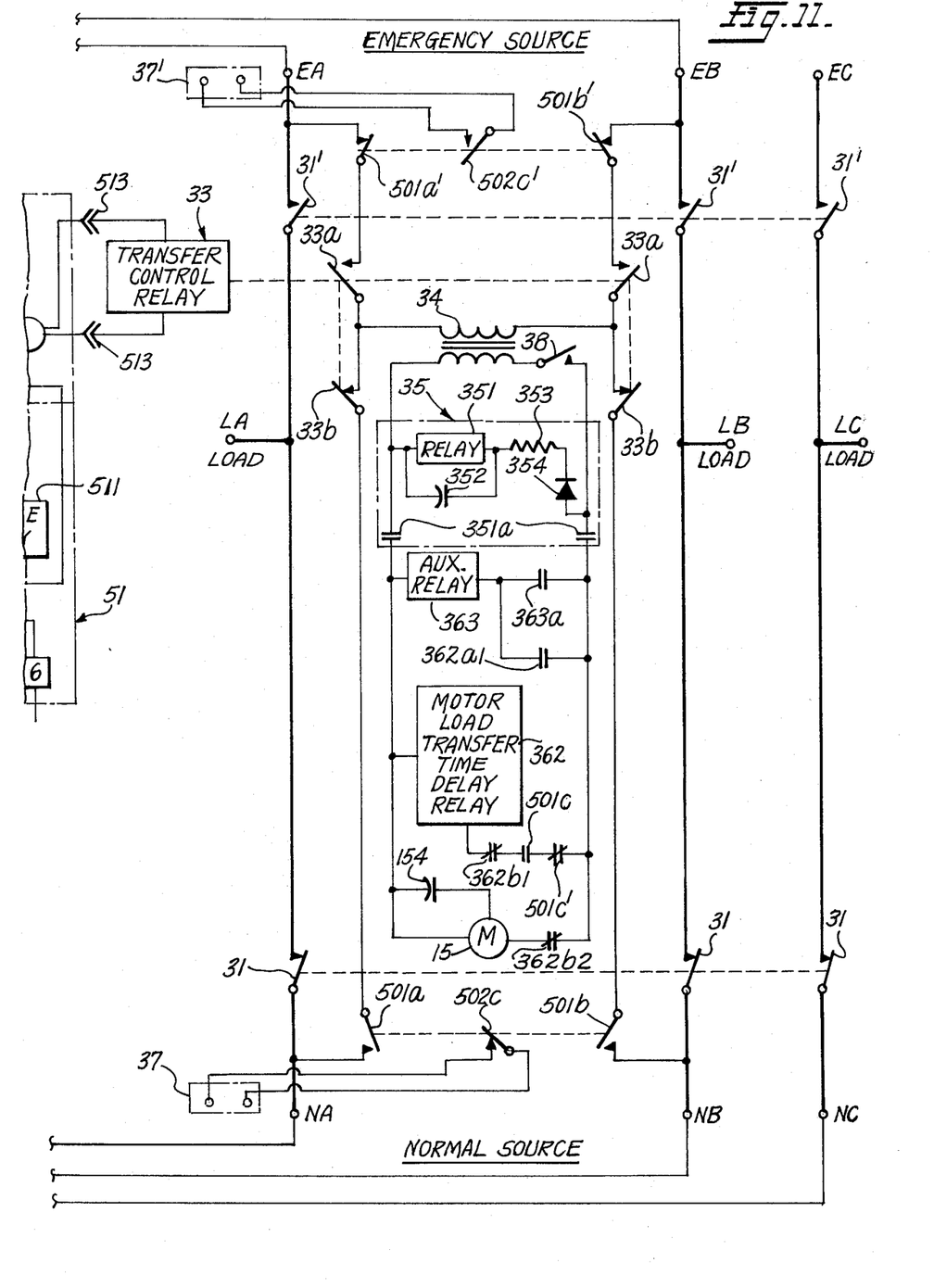
FIG. 11 is a modification of the wiring diagram of FIG. 10.

Referring to FIG. 10, the electrical sequence of operation of items (12) and (14) through (22) is as follows:

THE ELECTRICAL SEQUENCE OF OPERATION

The electronic control module 51 is the intelligence unit that controls both the transfer to the emergency source and the retransfer to the normal source with the associated monitoring and time delays. Refer to FIG. 10.

A. Transfer to Emergency Source

The normal voltage monitor 516 continually verifies that the normal source voltage is within acceptable limits of drop-out and pick-up. This monitor 516 reacts to a "No or Low" voltage on any or all phases below the drop-out settings. An override on momentary outage time delay 519 is provided to override voltage dips causing nuisance starting of the engine generator set. During this delay period, the switch completely ignores the outage.

If the normal source voltage is restored above the pick-up setting within the override on momentary outage time delay period, the voltage monitor 516 and override time delay 519 are automatically reset.

If the override on momentary outage time delay 519 period expires before the normal source voltage is restored, the normal source electronic control initiates engine starting through the override relay 511 contacts ("a" contacts open and "b" contacts close). These contacts are located on electronic control modules, terminals TB1 through TB6 515. The emergency source electronic control is also activated.

The emergency source voltage monitor 520 and a frequency monitor 521 monitor the emergency source as it approaches acceptable pick-up settings both in voltage and frequency. When both the voltage and frequency of the emergency source have been verified, the transfer control relay (TCR) 33 is energized. The "a" contacts of the TCR 33 close and apply emergency source system rated voltage to the primary of control transformer (XFMR-1) 34. The secondary (115VAC) of XFMR-1 34 is applied to the motor protector relay (MPR) 351 and its associated diode (D) 354, capacitor (CAP2) 352 and resistor (RES) 353. The primary purpose of the MPR 35 circuit is to guarantee that the voltage applied to the gear motor 15 is always greater than the minimum voltage required for successful motor operation under any system voltage condition. The pick-up voltage of MPR relay 351 is set at approximately 75% of 115VAC. Secondary voltages above 85VAC energize the MPR relay 351 and its "a" contacts close to apply voltage to the transfer switch gearmotor (TSM) 15.

The drive system which is composed of gearmotor 15, cam 10, rocker arms 12, connecting linkage 13 and operating brackets 14 opens the normal molded case power switch 31 (all auxiliary TSNa 502c contacts open and TSNb 501a, 501b contacts close) and then closes the emergency molded case power switch 31'. When the emergency molded case power switch 31' closes, the auxiliary switch contacts TSEb1 501a' and TSEb2 501b' open to remove power from the drive system. All other auxiliary TSEa 502c' contacts close and TSEb 501a', 501b' contacts open. Transfer to emergency source is now complete.

B. Retransfer to Normal Source

When the normal source voltage rises above the pick-up setting of the normal source voltage monitor 516, the timing sequence toward load retransfer to the normal source is initiated. The retransfer to the normal source time delay 517 begins its timing period to allow the normal source to stabilize before retransfer. Subsequent normal source failures during this delay automatically reset the timer. At the end of this delay period the TCR relay 33 is de-energized. The "b" contacts of the TCR relay 33 close and apply normal source system rated voltage to the primary of the control transformer (XFMR-1) 34.

Secondary voltages above 85VAC energize the MPR relay 351 and its "a" contacts close to apply voltage to the transfer switch gearmotor (TSM) 15. The drive system opens the emergency molded case power switch 31' (all auxiliary TSEa 502c' contacts open and TSEb 501a', 502b' contacts close) and closes the normal molded case power switch 31. When the normal molded case switch 31 closes, the auxiliary switch contacts TSNb1 501a and TSNb2 501b open to remove power from the drive system. All other auxiliary TSNa 502c contacts close and TSNb 501a, 501b contacts open. Retransfer to the normal source is now complete.

After the retransfer to normal source, an additional engine running unloaded time delay 518 is provided to allow the engine generator set to run unloaded to allow a cooldown period after removing the load. At the end of this period, the override relay 511 energizes to signal engine shutdown.

A test switch 39 is provided to simulate a power failure for periodic testing of the automatic transfer switch.

ALTERNATE EMBODIMENT, TIME DELAY FOR MOTOR LOAD TRANSFER

This is an adjustable time delay in the neutral (both power switches in off) position using a pneumatic time delay relay 362 (MLT-TD). The circuitry in FIG. 11 to accomplish this operation is added between the motor protector relay 35 (MPR) contacts and the transfer switch motor (TSM) 15. Transfer switch operation is the same as previously discussed except, that in the neutral position, auxiliary contacts TSNb3 501c and TSEb3 501c' close to energize the MLT-TD 362 relay. MLT-TD relay 362 contact MLTb2 opens to remove power from the drive system. Contact MLTa1 closes to energize the auxiliary relay (AR) 363 which latches through contact ARa1. Contact ARb1 opens to de-energize relay MLT-TD 362. The time delay of the drop-out pneumatic relay now initiates. At the end of the delay period contact MLTb2 (TC) closes to re-energize the drive system to complete the transfer cycle. Motor load transfer operation for both transfer to emergency and retransfer to normal are the same.

RECAPITULATION

Why a Positive Both-Off Position of the Normal and Emergency Switches on Transfer and Retransfer is Vital in Automatic Transfer Switches.

By virtue of its location in the electrical distribution system, the automatic transfer switch may be required to interrupt currents ranging from zero to 20 times switch rating. Since the transfer and retransfer operations will be made between two power sources which are not in phase with each other, electrical connection between these sources must be positively avoided. Inadvertent connection could lead to catastrophic short circuit.

When switching contacts part to open an electric circuit, an arc will develop. The intensity of this arc will be determined by the impressed voltage, the magnitude of the current and the power factor of the load. It is this unpredictable arc which can lead to inadvertent connection between the two power sources.

In modern switching devices, arc control and disruption is attained through the use of steel vanes which encompass the switch contacts and which become magnetized by the magnetic field which surrounds the electrical conductors. The effect of these magnetized vanes is to move the arc into arc chambers to effectively stretch and cool the arc to disruption.

It will be evident therefore, that the degree of magnetization of these vanes is a function of the intensity of the magnetizing flux and that flux intensity is a function of the level of current in the conductors.

Thus, it will be seen that the effectiveness of the arc disrupting vanes at a current level of 20% of switch rating at a low power factor, as compared with a current level of 600% of switch rating at a low power factor must be considerably reduced.

Russell reports 2 cycles (on a 60 cycle basis) as adequate off time for successful switching between the two power sources. The by-products of electric arcing can be splattering of metallic particles and ionization of air and gases inside the enclosure—both providing conductive means. Unfortunately, industry standards require testing only at 600% of switch rating as the determinant for adequacy at all other current levels.

Lexington considers not less than 10 cycles (on a 60 cycle basis) as a safe off time on transfer and retransfer. The Lexington automatic transfer switches provide high speed opening of the switching contacts with an approximate 10 cycle dwell time in the both-off position of the switches.

Having thus disclosed the invention, what is claimed is:

1. An automatic transfer switch comprising:
   a pair of molded case switches having contacts operated by lever interconnections and a cam mechanism which sequences one switch of said pair for the normal power source and the other switch of said pair for the emergency power source whereby said lever interconnections position the contacts of one of said switches to be closed while the other is open;
   a rotatable cam mechanism for programmed sequencing the make and break of the contacts to each of said molded case switches, one for the normal power source and the other for the emergency power source assuring a programmed time interval time for arc extinction during transfer and retransfer;
   vertically stacked bus bars for normal and emergency load connections to both of each said molded case switches; and
   detachable connectors for the load cables for the load circuits mounted at the top of said vertically stacked bus bars facilitating connection to either top or bottom by removal and reattachment at the bottom and thereby facilitating connection of the power conductors.

2. An automatic transfer switch as claimed in claim 1 wherein said cam mechanism comprises a cam plate having a cam track, roller followers in said cam track and rocker arms for each follower to provide precise positioning of the lever mechanism to operate the contacts of the molded case switches.

3. An automatic transfer switch as claimed in claim 2 wherein a gear motor of high torque which is unidirectional is provided to rotate said cam.

4. An automatic transfer switch as claimed in claim 3 including an auxiliary interlock mechanism below said cam mechanism comprising a center fulcrummed elongated member and two plungers at the end thereof to prevent both contacts of both molded case switches from being on at the same time by one plunger being up while the other is down and wherein toggles are provided, one toggle for each molded case switch to visualize the on and off positions of each molded case switch of the pair and thereby confirm that both contacts of both switches are not on.

5. An automatic transfer switch comprising:
a cam drive mechanism;
a lever linkage for said cam drive mechanism to operate a pair of molded case switches;
a pair of molded case switches;
vertically extending bus bars;
said molded case switches being detachably mounted over said vertically extending bus bars;
said cam mechanism comprising a plate, a track, a rise, and pins for sequencing one switch of said pair for the normal power source and the other switch of said pair from said rise for the emergency power source and precisely positioning the lever linkage to assure that one of said switches is open while the other is closed;
the dwell of the cam track providing programmed intervals during transfer and retransfer to assure arc extinction in the molded case switches.

6. An automatic transfer switch as claimed in claim 5 including an escapement for said cam mechanism to facilitate positioning of the cam to allow the gear motor to coast to a halt.

7. A switch as claimed in claim 5 wherein there is provided an auxiliary mechanical interlock means comprising an elongated member fulcrummed at its center which is connected to the plungers one at each end of said member and is located below said molded case switches.

* * * * *